United States Patent
Iino et al.

(10) Patent No.: US 6,175,424 B1
(45) Date of Patent: Jan. 16, 2001

(54) IMAGE PROCESSING APPARATUS AND IMAGE PROCESSING METHOD

(75) Inventors: Akio Iino; Hisashi Matsumoto, both of Kawasaki (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 08/991,612

(22) Filed: Dec. 16, 1997

(30) Foreign Application Priority Data

Dec. 20, 1996 (JP) .................................................. 8-341363

(51) Int. Cl.⁷ .................................................. H04N 1/405
(52) U.S. Cl. .............................................. 358/1.9; 358/456
(58) Field of Search ........................... 358/1.9, 456, 466, 358/458, 448; 382/270, 260, 275, 264, 252, 251, 265

(56) References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,608,577 | 8/1986 | Hori . |
| 4,723,129 | 2/1988 | Endo et al. . |
| 4,740,796 | 4/1988 | Endo et al. . |
| 4,958,236 | * 9/1990 | Nagashima et al. ................ 358/450 |

FOREIGN PATENT DOCUMENTS

| | | |
|---|---|---|
| 0 295 105 | 12/1988 | (EP) . |
| 0 558 008 | 9/1993 | (EP) . |
| 54-56847 | 5/1979 | (JP) . |
| 59-123670 | 7/1984 | (JP) . |
| 59-138461 | 8/1984 | (JP) . |
| 60-71260 | 4/1985 | (JP) . |

* cited by examiner

Primary Examiner—Scott Rogers
(74) Attorney, Agent, or Firm—Fitzpatrick, Cella, Harper & Scinto

(57) ABSTRACT

An image processing method and apparatus employing a cyclic error diffusion method for binarizing a basic image represented by multivalued data, in order to form a high quality image represented in pseudo tones with reduced noise caused by the binarization. When each pixel is sequentially binarized by applying the error diffusion method to the basic image, errors generated at one edge of the basic image are incorporated into the edge of the other side, and error diffusion is performed while incorporating the errors. Furthermore, a supplemental image, which is a part of the basic image, is added to the upper edge of the basic image to form a combined image, and the error diffusion processing is performed by utilizing the combined image. Upon completing the binarization processing, binary data in the lower edge portion of the supplemental image is compared with binary data in the corresponding lower edge portion of the basic image, and pixel values in the area are corrected based on the comparison result.

16 Claims, 14 Drawing Sheets

FIG. 6

| 1 | 1 | 1 | 1 | 1 | 1 | 1 |
|---|---|---|---|---|---|---|
| 1 | 1 | 2 | 2 | 2 | 1 | 1 |
| 1 | 2 | 2 | 4 | 2 | 2 | 1 |
| 1 | 2 | 4 | ▨ |   |   |   |
| 1 | 2 | 2 | 4 | 2 | 2 | 1 |
| 1 | 1 | 2 | 2 | 2 | 1 | 1 |
| 1 | 1 | 1 | 1 | 1 | 1 | 1 |

IMAGE PROCESSING APPARATUS AND IMAGE PROCESSING METHOD

BACKGROUND OF THE INVENTION

The present invention relates to an image processing apparatus and image processing method and, more particularly, to an image processing apparatus and image processing method for representing a multivalued image inputted by e.g., a scanner or computer or the like, in pseudo tones when the multivalued image is repeatedly bitmapped to be outputted to a device having a low tonality-representation capability.

Error diffusion method and dither method are known as the conventional method of pseudo-tonality representation. According to the error diffusion method, as shown in FIG. 10, a diffusion coefficient is assigned to plural subsequent pixels of a pixel of interest, so as to distribute a quantization error generated at the pixel of interest to the neighboring pixels in accordance with the diffusion coefficient. By this processing, density values of the entire image is preserved, enabling excellent pseudo-tonality representation.

According to the dither method, as shown in FIG. 11, a dither matrix with a given threshold value is prepared (in FIG. 11, the given matrix size is 4×4 pixels), and each pixel of the inputted multivalued image data is compared with the matrix on a one-to-one basis. If a pixel value of the inputted multivalued image data is larger than or equal to the threshold value, the pixel is set to ON, and if a pixel value of the multivalued image data is smaller than the threshold value, the pixel is set to OFF. As a result, an output having binary values is obtained. According to the dither method, since the regular arrangement of dots produces an artificial pattern, the resultant pseudo-tonality image has graininess. Therefore, an image reproduced by the dither method tends to have lower quality compared to an image reproduced by the error diffusion method.

Herein, taking a repeated design pattern as an example, such as designs printed on a fabric, e.g., a tie or handkerchief or the like, there are patterns as shown in FIGS. 12A to 12C: a simple pattern (FIG. 12B) generated by repeatedly printing a basic pattern (FIG. 12A), which is the base of the repeated design pattern, simply in horizontal and vertical directions; a zig-zag pattern (FIG. 12C) generated by repeatedly printing the basic pattern in horizontal and vertical directions while alternately shifting the basic pattern by half the size of the basic pattern, and the like. However, in a case where the basic pattern must be repeatedly printed for a large number of times, it is inefficient to repeatedly perform pseudo-tone processing on the entire image. In addition, if this processing is to be performed by executing software, the processing becomes unrealistic in view of its processing speed.

Furthermore, if only the basic pattern is binarized and the binary data is simply repeated to form an image, conspicuous noise is generated at the boundary portion of the basic patterns (this noise will be referred to as boundary noise) as shown in FIG. 13. It is considered that the noise is caused by discontinuity of binary processing at the boundary portion.

The suggested methods to eliminate the boundary noise include: a method where an exterior frame is added to the basic pattern to be drawn as shown in FIG. 14A (hereinafter referred to as "exterior-frame-addition method"), or a method where smoothing is performed at the boundary portion of the basic pattern as shown in FIG. 14B (hereinafter referred to as "boundary-smoothing method"). In the exterior-frame-addition method, the same multivalued image having a predetermined size is added to surround the basic pattern, and binary processing is performed on the entire image. As a result, binary data of the basic pattern is obtained. However, even if the obtained binary data is used repeatedly to form an image, boundary noise still appears due to the discontinuity at the boundary portion.

Moreover, even if smoothing processing is performed at the boundary portion of the binary data to eliminate the boundary noise of the obtained binary data by employing the boundary smoothing method, this still causes a problem of making the boundary portion unclear in a case where, for instance, the image of the boundary portion includes an edge portion such as thin lines.

SUMMARY OF THE INVENTION

The present invention has been made in consideration of the above situation, and has as its object to provide a method and apparatus which can reduce boundary noise caused by repeatedly printing a specific image, without deteriorating quality of an entire image, by utilizing the modified error diffusion method.

According to one aspect of the present invention, the foregoing object is attained by providing an image processing apparatus for converting a basic image represented by multivalued data into a binary image representing the basic image in pseudo tones, and repeatedly printing the binary image on a print medium, comprising: binarizing means for consecutively comparing a value of each pixel representing the basic image with a predetermined threshold value, and performing binarization on the pixel in accordance with the comparison result; diffusing means for diffusing errors, generated in the binarization, to neighboring pixels of a pixel of interest by employing an error diffusion matrix having a predetermined size; and incorporating means for incorporating, among the errors diffused by the diffusing means, an error which is outside the basic image into an area where the binarizing means has not performed the binarization.

According to another aspect of the present invention, the foregoing object is attained by providing an image processing method for converting a basic image represented by multivalued data into a binary image representing the basic image in pseudo tones, and repeatedly printing the binary image on a print medium, comprising the steps of: consecutively comparing a value of each pixel representing the basic image with a predetermined threshold value, and performing binarization on the pixel in accordance with the comparison result; diffusing errors, generated in the binarization, to neighboring pixels of a pixel of interest by employing an error diffusion matrix having a predetermined size; and incorporating, among the errors diffused in the diffusing step, an error which is outside the basic image into an area where the binarization has not been performed in the binarizing step.

In accordance with the present invention as described above, when a basic image represented by multivalued data is converted to a binary image which represents the basic image in pseudo tones, and when the converted binary image is repeatedly printed on a print medium, a value of each pixel representing the basic image is consecutively compared with a predetermined threshold value, and the pixel is binarized in accordance with the comparison result. Errors generated in the binarization are distributed to neighboring pixels of the pixel of interest by employing an error diffusion matrix having a predetermined size. Then, among the distributed errors, an error which is outside the basic image is incorporated into an area where the binarization has not been performed.

The invention is particularly advantageous since a value of image data which expresses a basic image and is repeatedly used as a pattern, is compared with a predetermined threshold value, and among errors generated in binarization performed in accordance with the comparison result, an error at an edge portion of the basic image is incorporated into an area where binarization has not been performed. Accordingly, in a case where the basic image is binarized by utilizing the error diffusion method and the binary image is repeatedly printed, noise generated at a boundary portion of the binary image is reduced to a visibly unrecognizable level. As a result, it is possible to minimize the quality deterioration of the entire image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 6 shows an average value calculation filter used in the comparison processing;

DETAILED DESCRIPTION OF THE PREFERRED EMBODIMENTS

Preferred embodiments of the present invention will be described in detail in accordance with the accompanying drawings.

Figure 1:
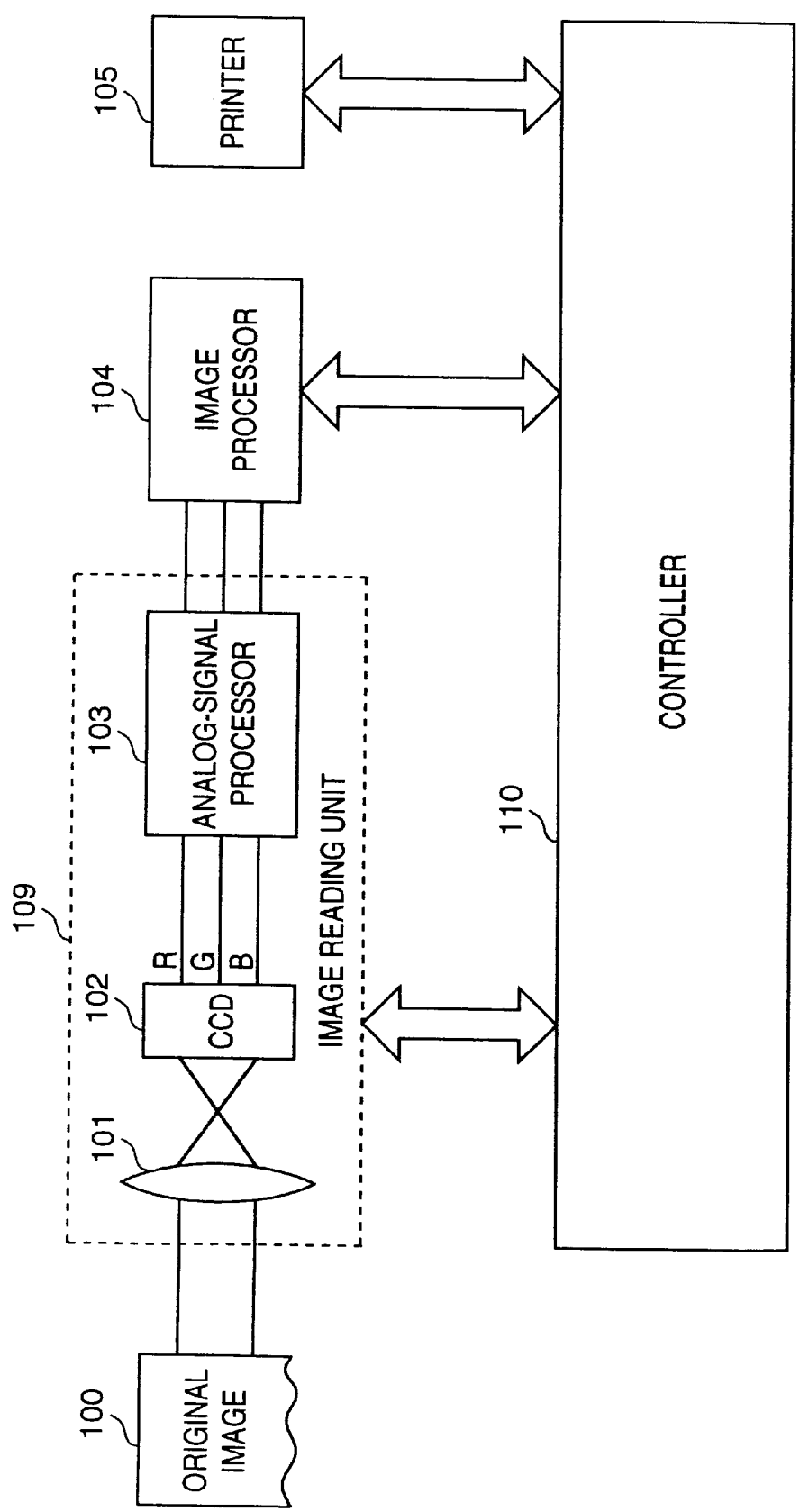
FIG. 1 is a block diagram showing a configuration of an image processing apparatus as a typical embodiment of the present invention.

FIG. 1 is a block diagram showing the configuration of the image processing apparatus as a typical embodiment of the present invention. The image processing apparatus is configured by an image reading unit 109 for reading an original image 100, an image processor 104 for processing the read image, a printer 105 for printing an image on a printing medium (paper, board, cloth and the like) based on the data where image processing has been performed, and a controller 110 for controlling the image reading unit 109, image processor 104 and printer 105.

The image reading unit 109 is configured by a lens 101, a CCD sensor 102, an analog-signal processor 103 and the like. Based on the original image projected in the CCD sensor 102 via the lens 101, the CCD sensor 102 generates analog electrical signals corresponding to R (red), G (green) and B (blue). The electrical signals are inputted to the analog-signal processor 103 where sample & hold (S-H processing), dark-level correction and the like are performed for each of R, G and B color components. Then, the electrical signals are subjected to analog/digital conversion (A/D conversion), thereby generating digital image data consisting of R, G and B components.

The digital full-color signals are inputted to the image processor 104. In the image processor 104, necessary correction processing caused by reading processing of the image reading unit 109, e.g. shading correction, color correction, γ correction and the like, and preprocessing or data modification such as brightness-density transformation, UCR processing, smoothing, edge emphasizing processing or the like, are performed. Density image data consisting of Y, M, C and K components obtained as a result of the above processing, is outputted to the printer 105 via the controller 110.

The printer 105 is an ink-jet printer utilizing the ink-jet type printhead, which prints an image on a printing medium by discharging ink.

Figure 2:
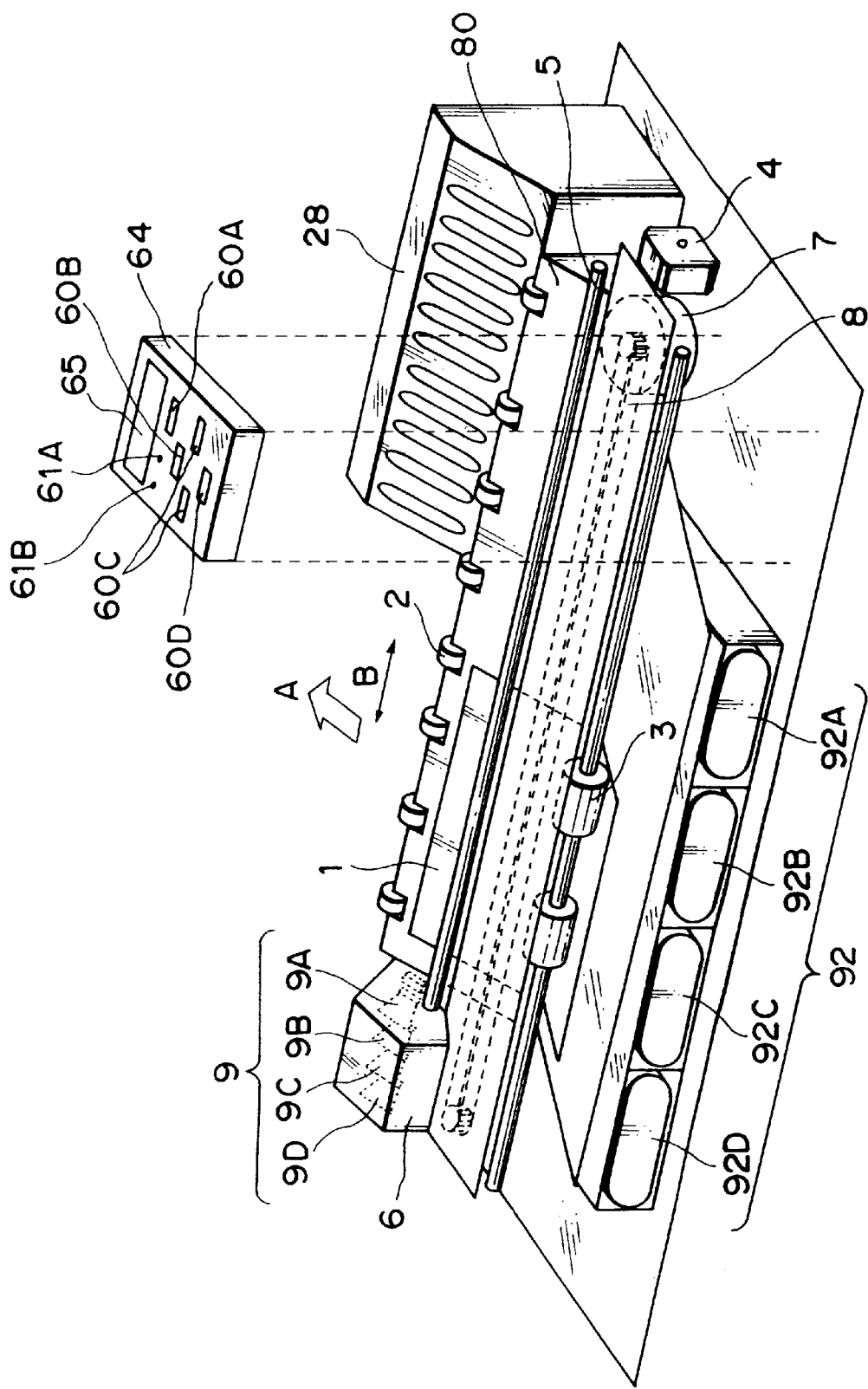
FIG. 2 is a perspective view showing an external appearance of a printer having a printhead which performs printing in accordance with the ink-jet method applied to the printer shown in FIG. 1.

FIG. 2 is a perspective view showing an external appearance of the printer 105.

In FIG. 2, reference numeral 1 denotes a print medium such as a print paper, a plastic sheet or a cloth; 2 and 3, conveyance rollers provided on and under a print area of the print medium 1, for conveying the print medium 1 in the arrow A direction; 4, a sheet feed motor which drives the conveyance rollers 2 and 3; 5, a guide shaft provided between the conveyance rollers 2 and 3 and parallel to the rotational axes of the conveyance rollers 2 and 3; 6, a carriage which scans (in the arrow B direction) along the guide shaft 5; 7, a carriage motor which scan-moves the carriage 6; and 8, a belt which transmits the driving force of the carriage motor 7 to the carriage 6.

The carriage 6 holds four printheads 9A to 9D (hereinafter referred to as "printhead 9" generally indicating these four printheads) which respectively perform printing by discharging ink droplets in accordance with the ink-jet printing method. The printhead 9 is a color printhead for color image printing and comprises four printheads, 9A (K head), 9B (C head), 9C (M head) and 9D (Y head), respectively corresponding to K (black) color ink, C (cyan) color ink, M (magenta) color ink and Y (yellow) color ink, arrayed along the scanning direction of the carriage 6. The printheads 9A to 9D respectively have a plurality of (e.g., 64 or 128) ink discharge orifices arrayed in a direction diagonal to the scanning direction of the carriage 6. The front surface of each of the printheads 9A to 9D, positioned opposite to the print surface of the print medium 1, is spaced away from the print surface by a predetermined distance (e.g., 0.8 mm).

Note that logic circuits of these printheads 9A to 9D have the same construction.

An operation panel 64 is attached to an outer case (not shown) of the printer. The operation panel 64 has operation keys such as an online/off-line key 60A, a line feed key 60B, a print mode switch key 60C and a reset key 60D, LED lamps such as an alarm lamp 61A, a power source lamp 61B and a warning lamp and the like, and an LCD 65 which displays various messages.

Note that reference numeral 80 denotes a platen; and 92, an ink tank containing ink for printing a desired image on the print medium 1. The ink tank 92 has four ink compartments 92A to 92D respectively containing cyan (C) ink, magenta (M) ink, yellow (Y) ink and black (K) ink, corresponding to the print heads 9A to 9D.

Note that the controller, including a CPU for controlling the printer, the accompanying ROM, RAM and the like, is connected to a host computer (hereinafter simply referred to as a "host") to also perform printing by driving the various motors and the like based on instruction signals or data signals (print information) sent from the host computer and providing driving power (heating power) to energize electrothermal transducers (heaters) included in the printheads 9A to 9D.

Figure 3:
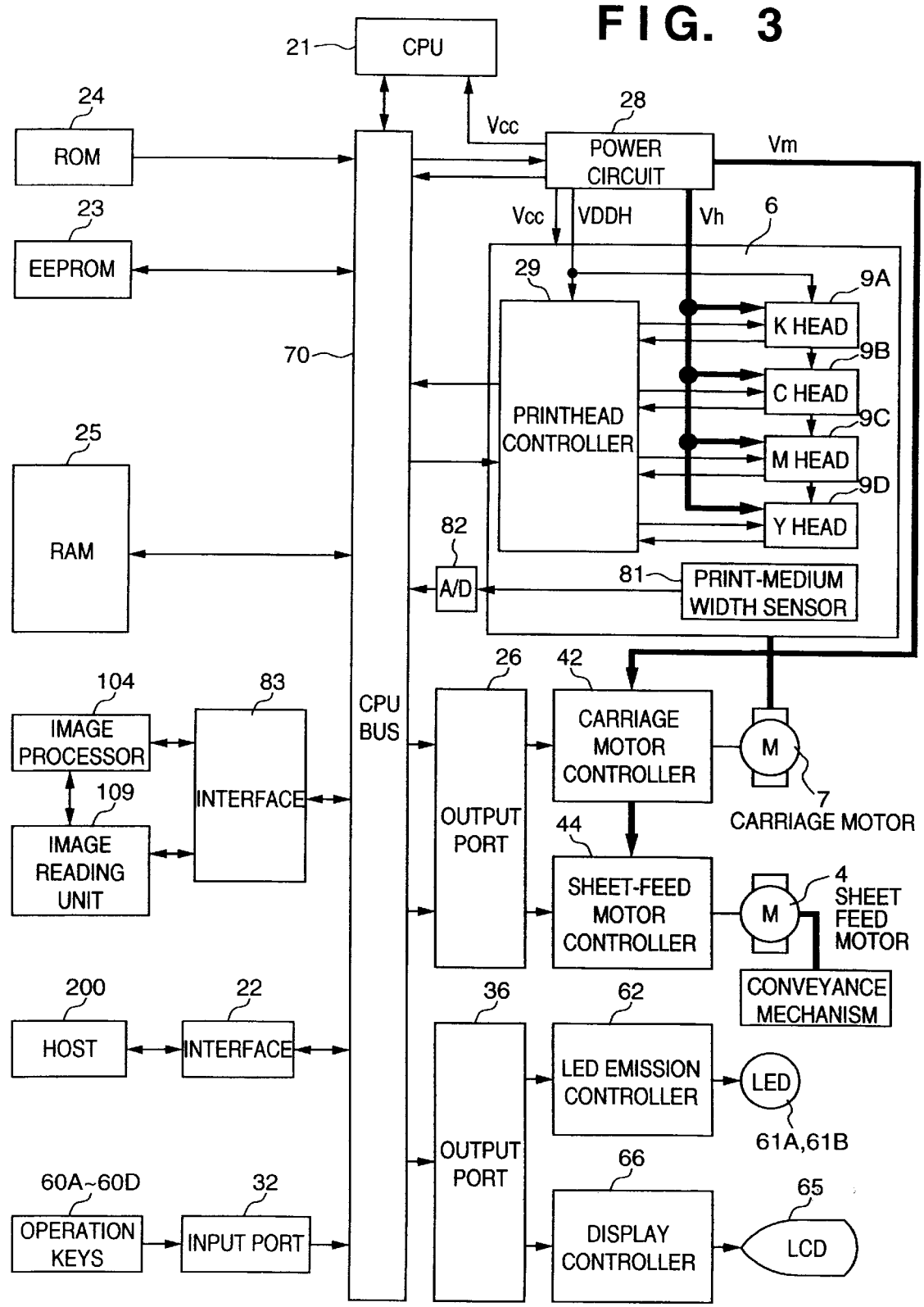
FIG. 3 is a block diagram showing the construction of the controller of the printer shown in FIG. 1.

FIG. 3 is a block diagram showing the schematic construction of the controller of the printer in FIG. 1.

A CPU 21, in the form of microprocessor, is connected to the host 200 via an interface unit 22, and connected to the image processor 104 and image reading unit 109 via another interface unit 83. The CPU 21 accesses a ROM 24 in which control programs are stored, an EEPROM 23 in which updatable control programs, processing programs, various constant data and the like are stored, and a RAM 25 in which an instruction signal (command) and a print information signal received from the host 200 via the interface unit 22 as well as density image data transferred from the image processor 104 via the interface 83 are stored, and the CPU 21 controls printing operation based on the information stored in these memories.

The CPU 21 moves the carriage 6 by driving the carriage motor 7 via an output port 26 and a carriage motor controller 42, and operates the conveyance mechanism such as the conveyance rollers 2 and 3 by driving the sheet feed motor 4 via the output port 26 and a sheet-feed-motor controller 44. Further, the CPU 21 drives the printheads 9A to 9D via a printhead controller 29, based on print information stored in the RAM 25, so as to print a de si red image on the print medium 1.

Further, a power circuit 28 outputs logic driving current voltage Vcc (e.g., 5 V) to drive the CPU 21 or printhead controller 29, motor driving voltage Vm (e.g., 30 V) for the various motors, heat voltage Vh (e.g., 25 V) to drive the printhead 9, and backup voltage VDDH for protecting the printhead 9. The heat voltage Vh is applied to the printhead 9, and the backup voltage VDDH, to the printhead controller 29 and the printhead 9.

Further, an instruction inputted from the operation keys 60A to 60D is transferred to the CPU 21 via an input port 32, and when the instruction from the CPU 21 is transferred via an output port 36 to an LED emission controller 62, the alarm lamp 61A and power source lamp 61B are lit, or when the instruction from the CPU 21 is transferred to a display controller 66, the LCD 65 displays a message.

Moreover, the carriage 6 comprises a print-medium-width sensor 81. A signal for detecting the width of the print medium 1 is transmitted to the CPU 21 via an A/D converter 82.

Figure 12A:
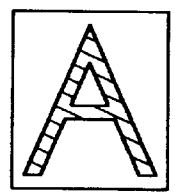
FIGS. 12A, 12B and 12C show a basic image and patterns formed by repetition of the basic image.

Next, description will be provided on image processing performed by the image processing apparatus having the above-described construction, in a case where the basic pattern "A" shown in FIG. 12 is repeatedly printed in the horizontal and vertical directions on a print medium such as a fabric.

Figure 4:
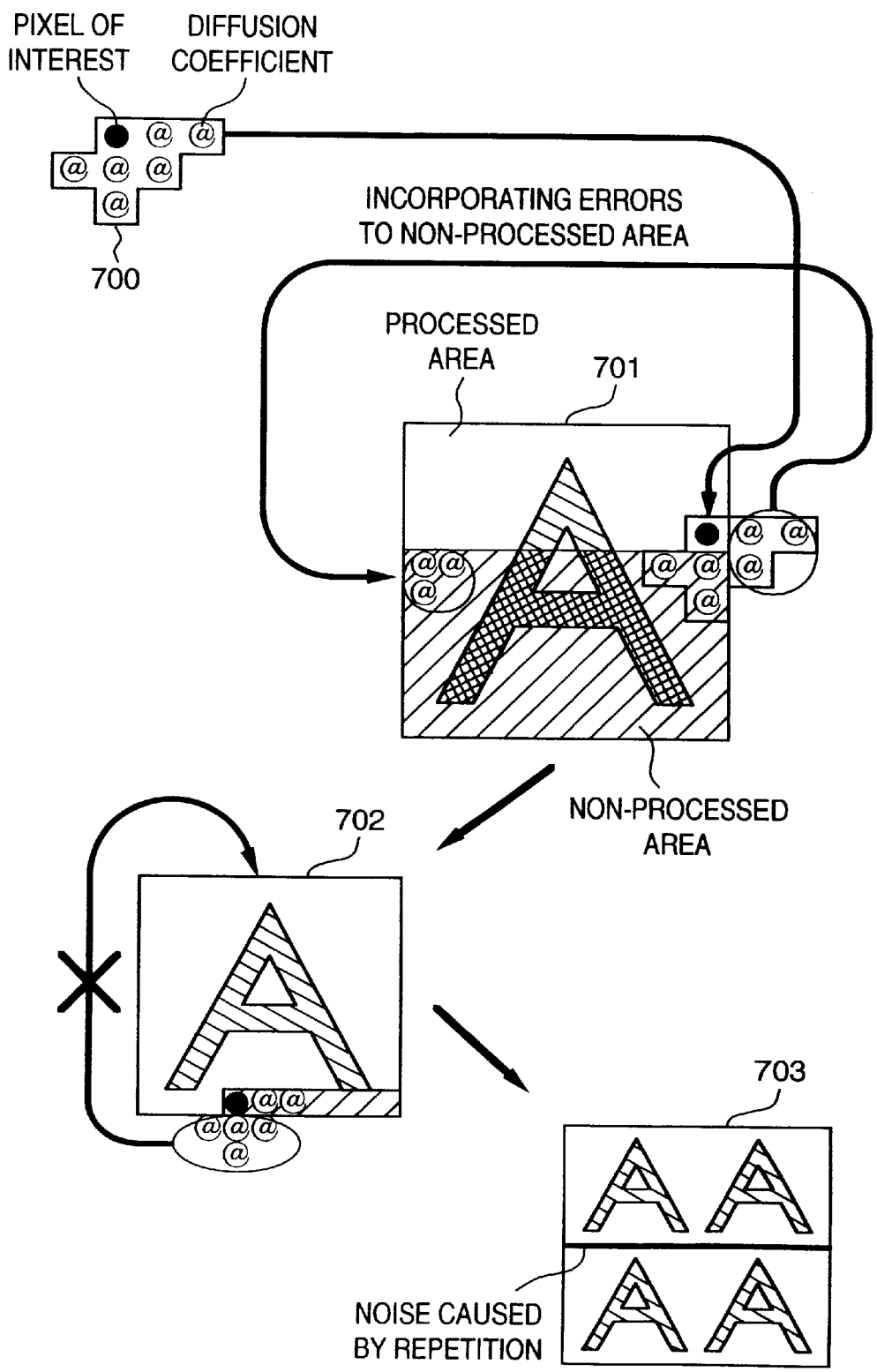
FIG. 4 is an illustration showing processing of incorporating an error in the horizontal direction by applying cyclic error diffusion method according to the present embodiment.

FIG. 4 illustrates how an error diffusion method according to this embodiment of the present invention is applied to the case where the basic pattern is repeatedly printed in the horizontal direction.

Conventionally, in a case where each pixel of an image is sequentially and laterally binarized from left to right at the top of the image with using a predetermined threshold value, more particularly, in a case where the binarization is performed while diffusing errors by employing e.g., an error diffusion matrix 700 as shown in FIG. 4, if the area, to which the error diffusion matrix 700 is applied, exceeds the right edge of the image, the errors outside the image are truncated.

On the other hand, according to the present embodiment, if a pixel of interest is at the right edge of the image and errors corresponding to three pixels of the error diffusion matrix 700 are outside the image, the errors are incorporated in the area where binarization has not been performed (e.g., the hatched portion 701 in FIG. 4); thus, error diffusion is executed while incorporating such errors. As described above, the processing related to error diffusion in the present embodiment is different from the conventional processing at the edge portion of the image.

More specifically, the errors outside of the image at the right edge of the image, which are conventionally truncated, are incorporated in the left edge portion of the image, in order to assure horizontal continuity of the error diffusion processing in connection with the repeated print of the basic pattern. In the example 701 shown in FIG. 4, since binarization is completed with respect to the line including the pixel of interest, the errors outside the image in that line are incorporated in the subsequent lines. It is considered that this processing causes almost no visible deterioration in image quality.

When the aforementioned series of processing is repeated until the processing reaches the last line of the image, errors will exceed the bottom edge of the image as shown in the illustration 702 in FIG. 4. It would be ideal to incorporate the errors in the top left portion of the image; however, since binarization has already been performed on this portion, incorporating the errors would be impossible. In other words, if the basic pattern is repeatedly printed and error diffusion is performed in the above-described manner while incorporating errors as described above, the boundary noise in the vertical direction can be reduced, but boundary noise in the horizontal direction still remains as shown in the illustration 703 in FIG. 4.

In view of the above, the present embodiment executes the following processing in addition to the above-described processing for incorporating errors.

Figure 5:
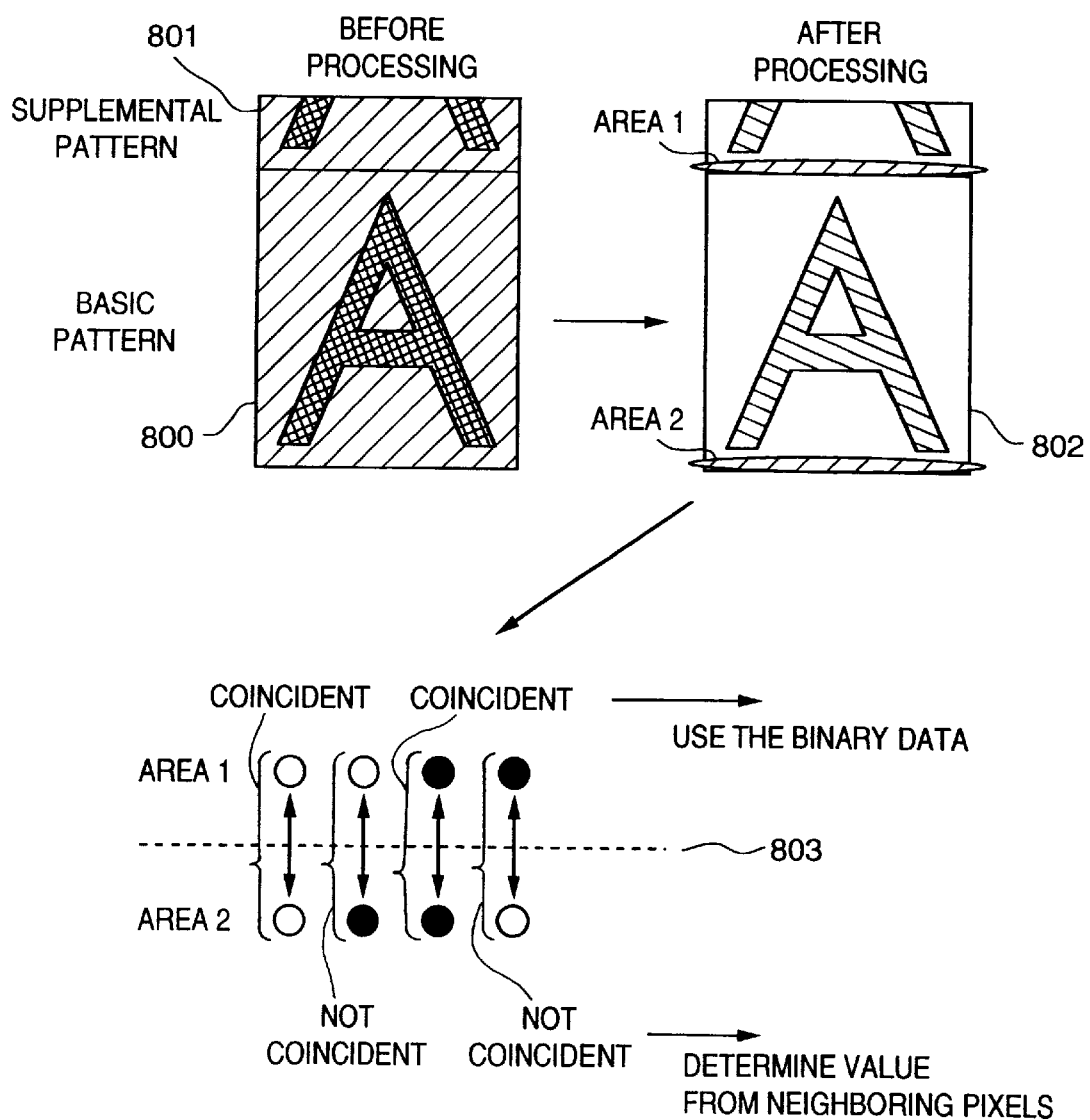
FIG. 5 is an illustration showing the concept of comparison processing in the vertical direction, applying the cyclic error diffusion method according to the present embodiment.

FIG. 5 illustrates how the error diffusion method according to this embodiment of the present invention is applied when the basic pattern is repeatedly printed in the vertical direction.

A supplemental pattern 801 having a predetermined size, which is a partial cut-out of the basic pattern, is added to the top portion of the basic pattern 800. Then, binarization is performed on the entire image of the combined pattern 802, where the supplemental pattern 801 is combined with the basic pattern 800, by the error diffusion method including the aforementioned processing of incorporating errors. Upon completing the binarization processing, "area 1" corresponding to the very bottom line of the supplemental pattern 801 is compared with "area 2" corresponding to the very bottom line of the basic pattern 800.

Since the supplemental pattern 802 is a partial cut-out of the basic pattern 801, the area 1 and the area 2 represent the same portion of the basic pattern 800. Therefore, if binary data of the areas 1 and 2 coincide perfectly, boundary noise should not be generated even when only the basic pattern 801 is repeatedly printed by utilizing the error diffusion method with the above-described processing of incorporating errors. However, in reality, the binary data in the areas 1 and 2 do not perfectly coincide as shown in the illustration 803 in FIG. 5, because dot values change in the process of binarization. Thus, it is necessary to adjust these dot values such that the dot arrangement in the binarized image exhibits visually good image quality.

For this purpose, the areas 1 and 2 are compared in the present embodiment. If the binary data in the areas 1 and 2 coincide, the coincident data is utilized without further processing. However, if the binary data do not coincide, the following processing is performed so that the neighboring pixel values are taken into consideration, and as a result, one of the binary data is matched to the other.

Figure 7:
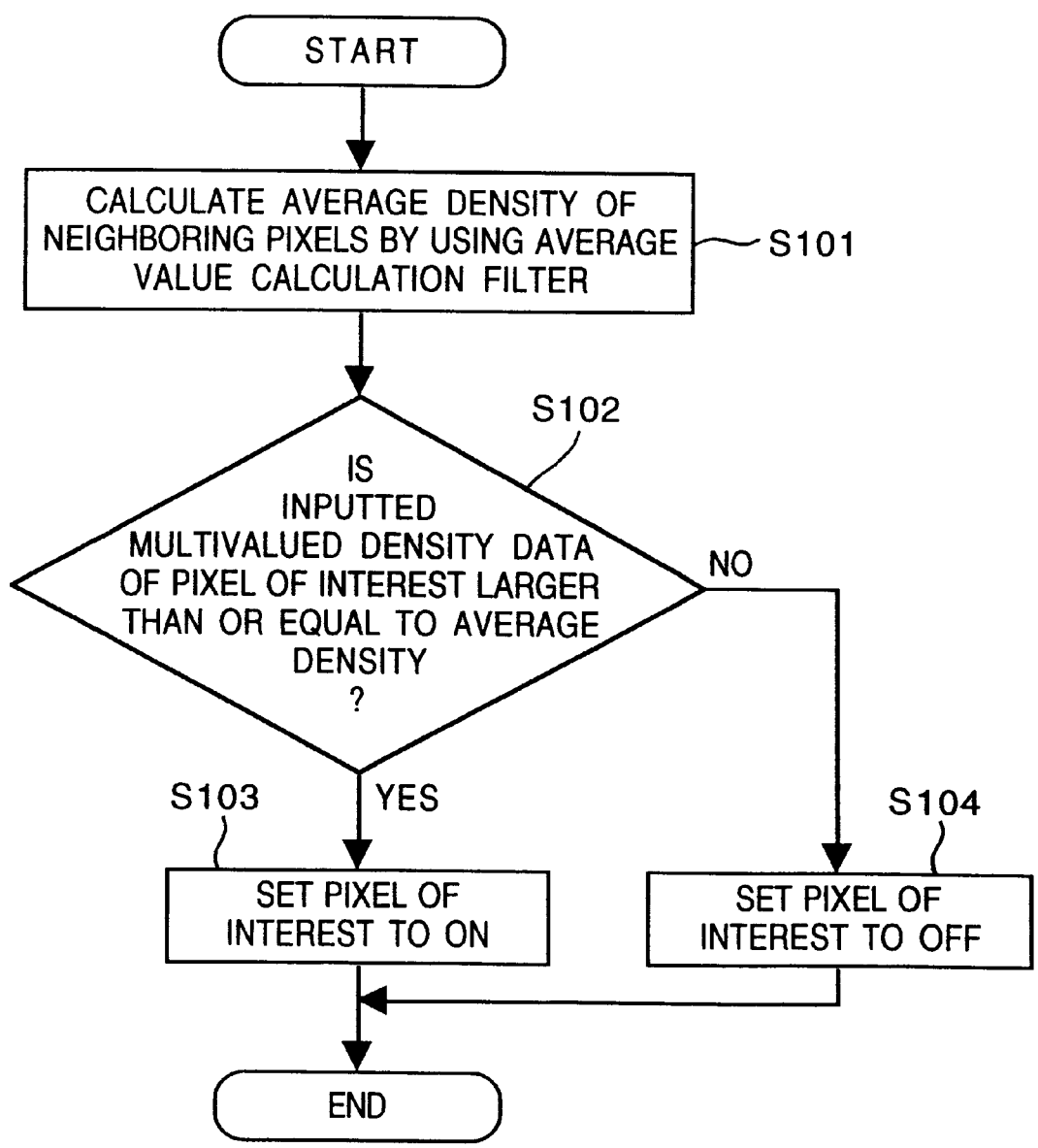
FIG. 7 is a flowchart showing steps of the comparison processing according to the present embodiment.

FIG. 6 shows a configuration of an average value calculation filter used to determine the data. FIG. 7 is a flowchart showing steps of the comparison processing.

Referring to FIG. 6, the shaded box is the pixel of interest and the values given to other pixels are weighting coefficients for calculating an average value. Herein, it is assumed that the pixel of interest is the position where binary data between the two areas are not coincident.

In step S101 in FIG. 7, an average value of binary data of the neighboring pixels which have already been binarized is calculated by utilizing the filter shown in FIG. 6. More specifically, the values of the neighboring pixels are weighted-averaged. In other words, with respect to each value of the neighboring pixels, the corresponding value of the average value calculation filter is multiplied (or weighed) and the obtained values are integrated, and the integrated value is divided by 69. Note that the value 69 is the sum of values of all the weighting coefficients.

In step S102, the average value obtained by the foregoing calculation is compared with inputted multivalued data of the pixel of interest. Herein, if the inputted value of the pixel of interest is larger than or equal to the average value, the processing proceeds to step S103 where the value of the pixel of interest is set to ON (1). If the inputted value of the pixel of interest is less than the average value, the processing proceeds to step S104 where the value of the pixel of interest is set to OFF (0).

As described above, with respect to the areas 1 and 2 shown in FIG. 5, the correction in consideration of the values of the neighboring pixels is performed only when the corresponding pixels in the areas 1 and 2 do not coincide. Accordingly, the boundary noise in the horizontal direction as exemplified by reference numeral 703 in FIG. 4 is reduced; thus deterioration in image quality is minimized.

It is known, from experiments, that in a case of employing an error diffusion matrix having the size similar to that of the present embodiment, ten lines are the sufficient length for the supplemental pattern.

Figure 8:
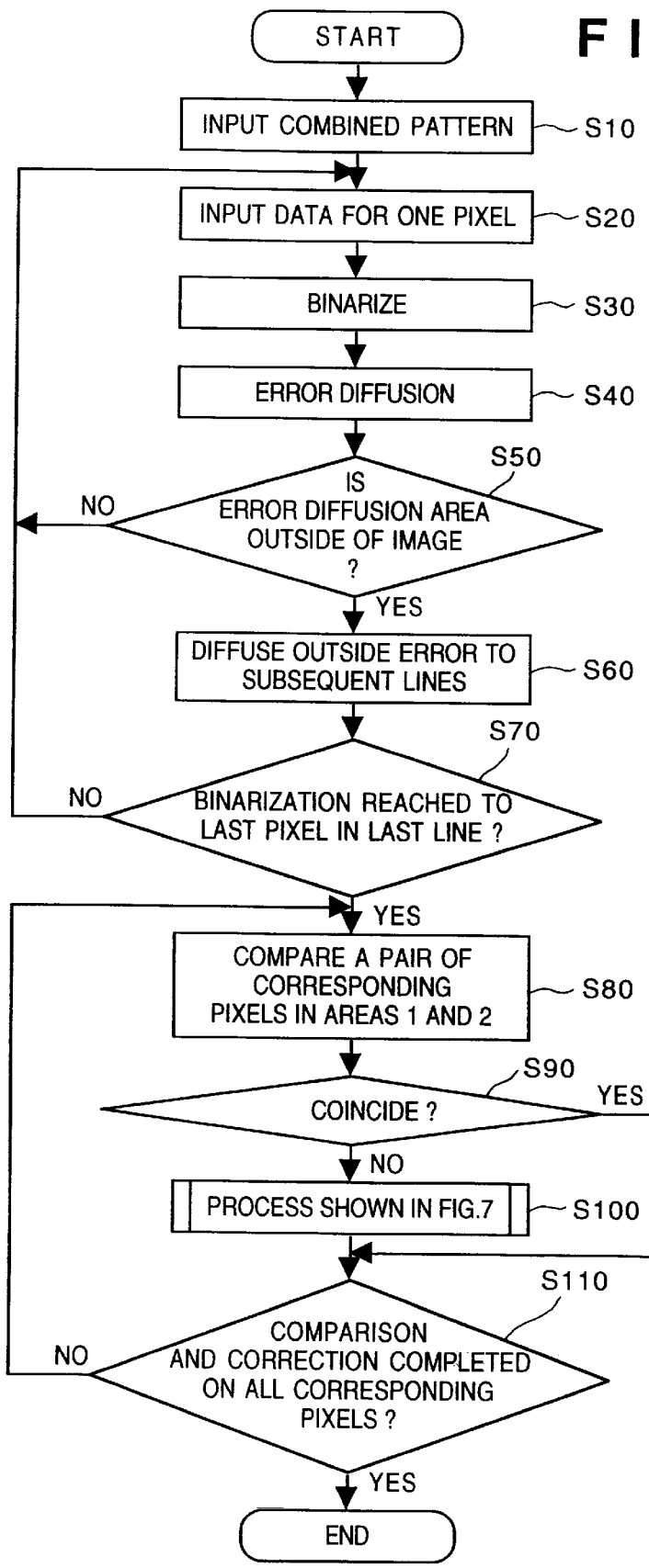
FIG. 8 is a flowchart showing the overall processing of binarization processing according to the present embodiment.

FIG. 8 is a flowchart showing the series of image processing described above.

First in step S10, the combined pattern 802 shown in FIG. 5 where the supplemental pattern and basic pattern are combined, is inputted. In step S20, multivalued data corresponding to one pixel is inputted. In step S30, the inputted multivalued data is compared with a predetermined threshold value, and the pixel of interest is binarized.

In step S40, errors generated by the binarization are diffused to the area where binarization has not been performed, in accordance with the error diffusion matrix 700.

Next in step S50, it is determined whether or not the area, to which the errors are to be diffused, is outside of the image of the combined pattern as shown in FIG. 4. Herein, if it is determined that the area is not outside of the image, the processing returns to step S20 where the next pixel is processed. Meanwhile, if it is determined that the area is outside of the image, the processing proceeds to step S60 where the outside errors are diffused to the subsequent line at the edge opposite to the edge of the outside error, where binarization has not been performed.

Note that the error diffusion processing in step S60 is not performed when binarization processing proceeds to the point where the area, to which errors are to be diffused, is beyond the last bottom line of the combined pattern.

In step S70, it is determined whether or not the binarization processing in steps S10 to S60 have been completed with respect to the last pixel in the last line. When it is determined that the binarization has been completed on the last pixel, the processing proceeds to step S80; while if it is determined that the binarization has not been completed, the processing returns to step S20 where the next pixel is processed.

In step S80, a pair of pixels are compared with respect to the corresponding pixels in area 1 and area 2 as shown in FIG. 5. It is determined in step S90 whether or not the corresponding pixel values coincide as a result of the comparison. If the pixel values do not coincide, the processing proceeds to step S100; while if they coincide, correction is not performed on the pixel of interest and the processing proceeds to step S110.

In step S100, the processing described in the flowchart in FIG. 7 is performed to correct the value of the pixel of interest with referring to the values of neighboring pixels. Then, the processing proceeds to step S100. In step S100, it is determined whether or not the comparison and correction processing have been completed with respect to all the corresponding pixels. Herein, if it is determined that the comparison and correction have not been completed, the processing returns to step S80 where the next pair of pixels are compared.

Meanwhile, if it is determined that the comparison and correction have been completed on all the corresponding pixels, the processing ends.

As has been described above, the present embodiment employs the error diffusion method (referred to as the "cyclic error diffusion method" in the present specification), which includes the processing of incorporating errors and comparing pixel values. When the cyclic error diffusion method is used instead of performing binarization an the entire image printed on a print medium, binarization is performed only on a basic pattern, which is the base image of a repeated design pattern. Therefore, by repeatedly printing the basic pattern for the necessary number of times, it is possible to attain excellent image quality where there is visually no boundary noise, as similar to the quality level where binarization is performed on the entire image.

By virtue of the above process, for instance, in a case where a particular pattern is repeatedly printed by discharging ink on a print medium such as a fabric, image processing is efficiently performed and the processing speed increases.

The binarization processing described above may be performed by employing a logical circuit in the image processor 104. However, in consideration of flexibility of processing, the binarization processing may be executed by using software if the CPU 21 has a high speed performance capability.

Moreover, the relative position between the pixel of interest and diffusion coefficient, direction of processing, specific positional relation at the time of incorporating errors and the method of comparison described herein are merely examples. Needless to say, there are various ways to perform the same processing. Furthermore, although binarization processing is performed in the present embodiment, the present invention is also applicable to, for instance, the error diffusion method of multivalued data.

Hereinafter, various modification will be described.

[First Modification]

In the foregoing embodiment, if values of corresponding pixels in the areas 1 and 2 do not coincide in the comparison processing, a weighted average value is obtained with respect to binary data of the neighboring pixels of the pixel of interest. It is also possible to calculate an average value of the difference between the binary data of the neighboring pixels and inputted multivalued data corresponding to the neighboring pixels, by utilizing an average value calculation filter. If the average value is less than 0, the pixel value of the non-coincident position is set to ON, and if the average value is more than or equal to 0, the pixel value is set to OFF.

As a result, binarization errors of the neighboring pixels of the pixel of interest can be reduced in view of areal tonality representation.

[Second Modification]

Figure 12B:
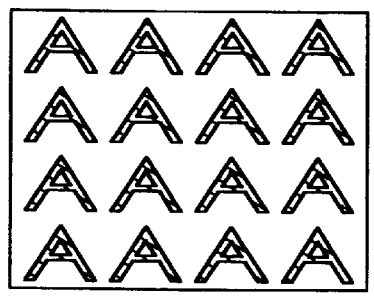
Figure 12C:
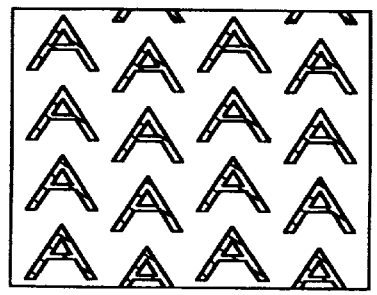
Figure 13:
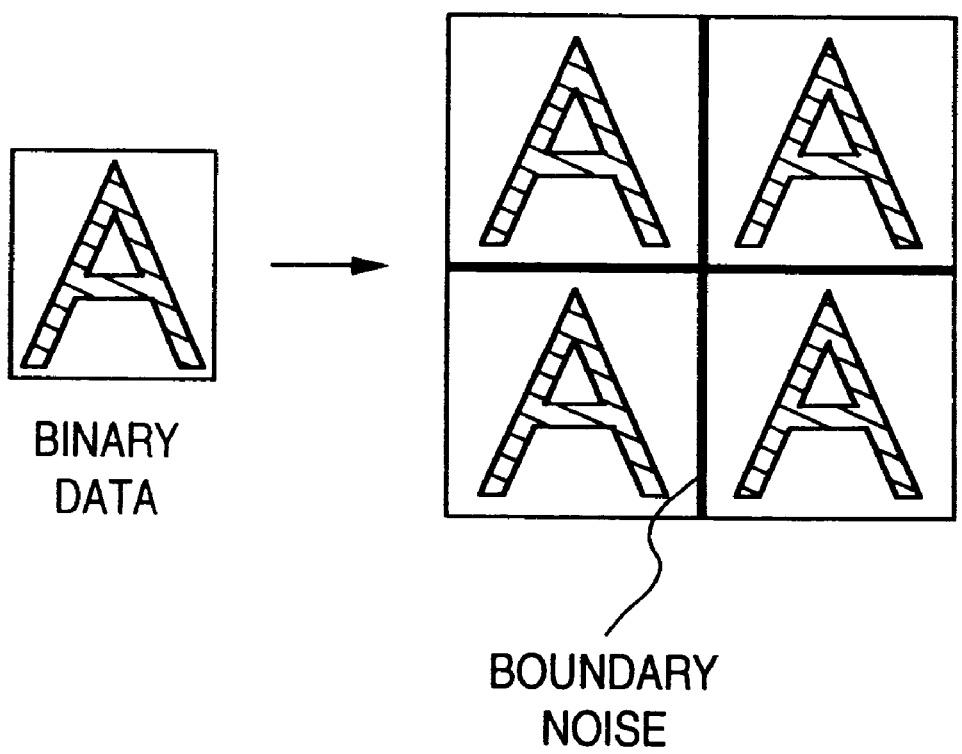
FIG. 13 illustrates boundary noise caused by repetition of binary data.
Figure 14A:
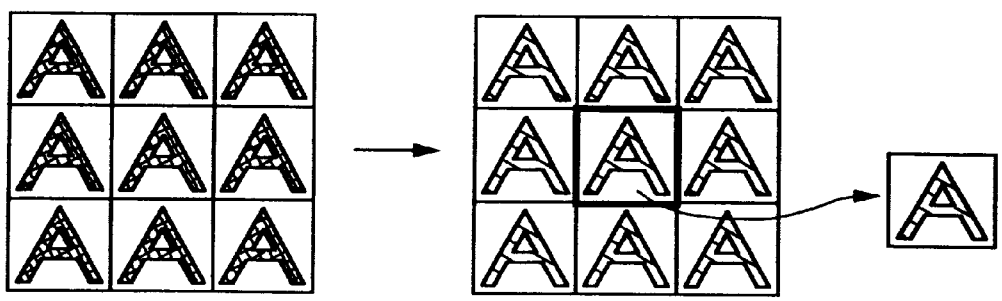
FIGS. 14A and 14B are explanatory views explaining the conventional method of reducing the boundary noise.
Figure 14B:
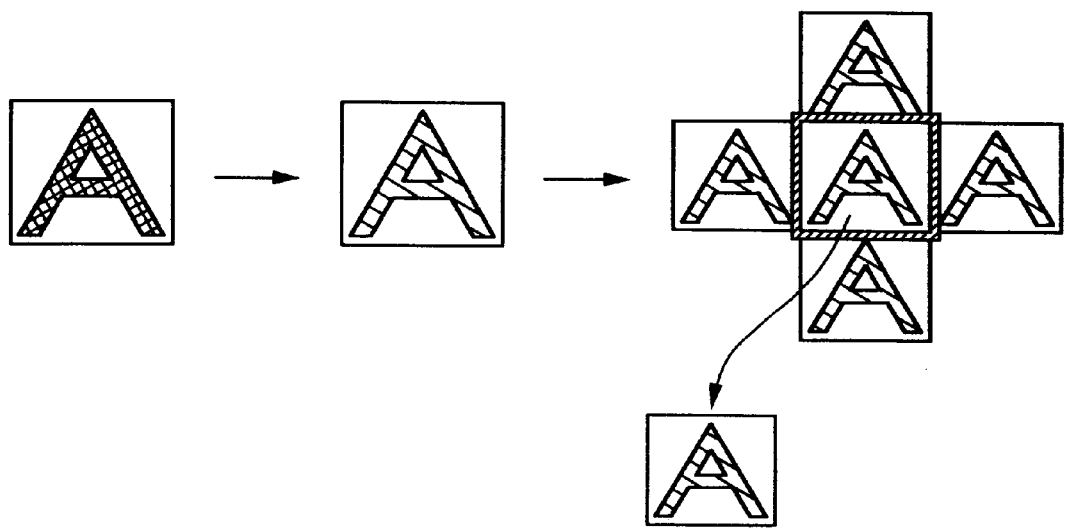

In the above embodiment, description has been provided on the example where the basic pattern is repeatedly printed as shown in FIG. 12B. The above-described cyclic error diffusion method is directly applied to a case where the basic pattern is repeatedly printed as shown in FIG. 12C. Since the basic pattern aligned in the vertical direction is alternately shifted in the vertical direction by half the size of the basic pattern, the processing for boundary noise reduction becomes complicated. Therefore, the following processing is performed instead.

More specifically, the direction of the processing for incorporating errors in the cyclic error diffusion method is changed from the horizontal direction to the vertical direction.

Figure 9:
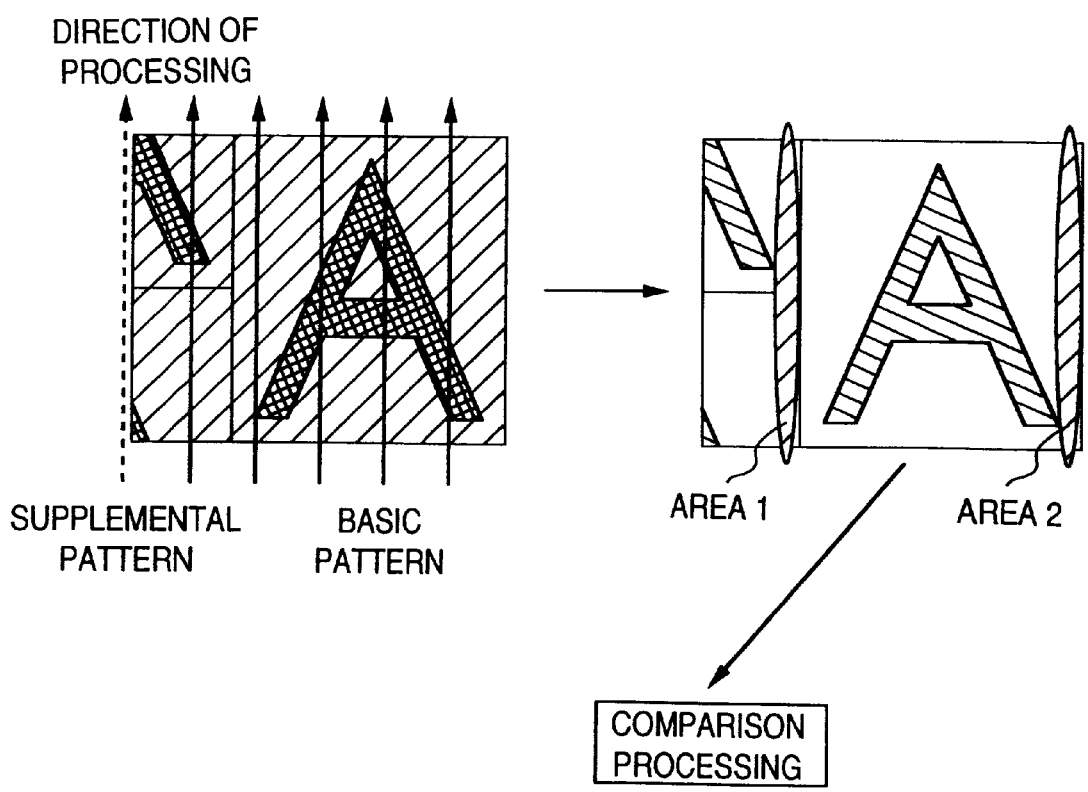
FIG. 9 is an illustration showing how the cyclic error diffusion method is applied to the modified embodiment of the present invention.
Figure 10:
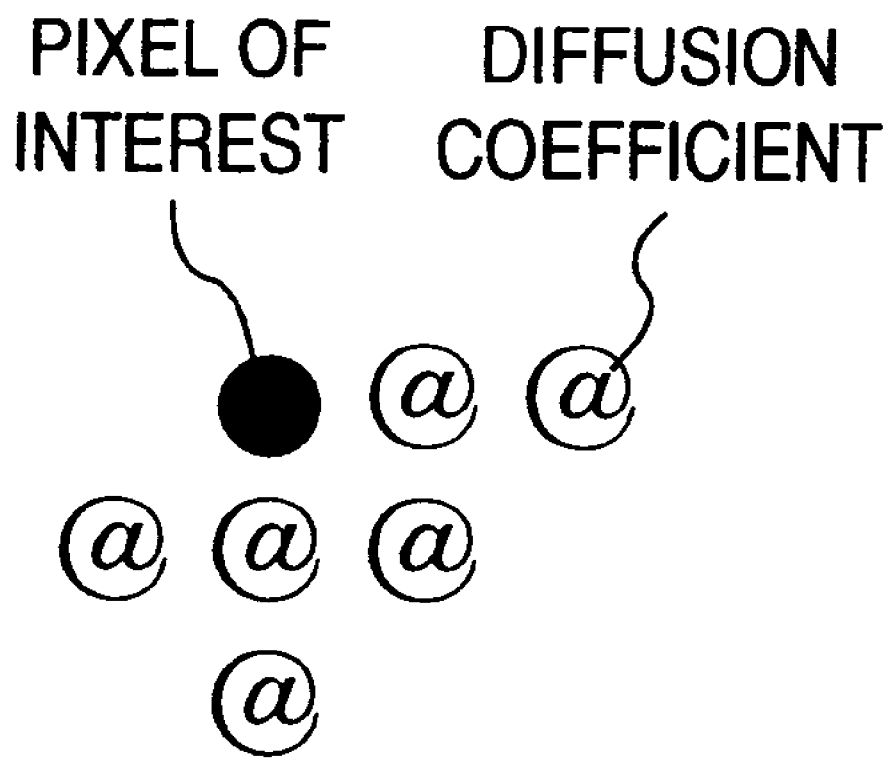
FIG. 10 is an explanatory view showing the relation between a pixel of interest and diffusion coefficients used in an error diffusion method.
Figure 11:
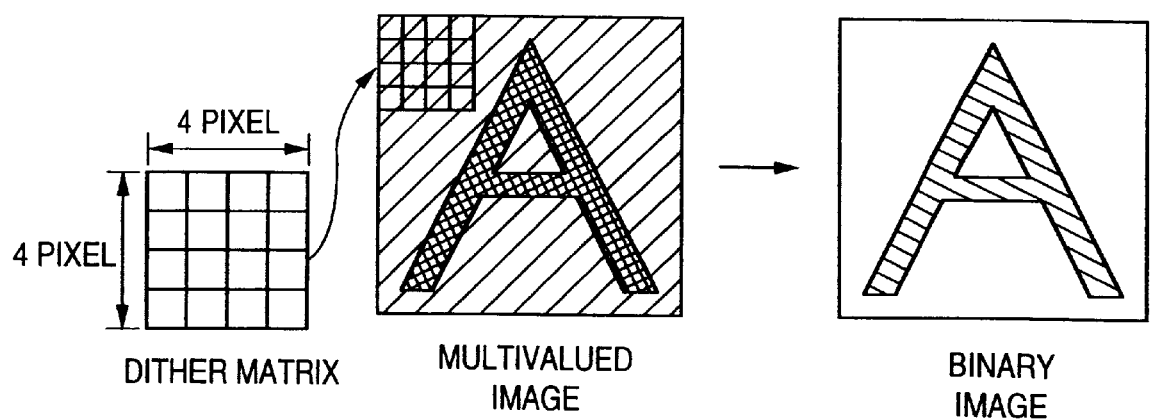
FIG. 11 is an explanatory view showing binarization processing according to a dither method.

FIG. 9 shows how the cyclic error diffusion method is applied to the processing in the vertical direction.

In this case, the supplemental pattern is added to the left side of the basic pattern while the supplemental pattern is shifted in the vertical direction by half the size of the basic pattern. Then, beginning from the bottom left of the pattern of the combined image formed as above, binarization of the basic pattern is executed in the vertical direction by utilizing the error diffusion matrix. When the processing reaches the top edge of the pattern, errors exceeding the top edge are incorporated in the bottom edge of the next line, and the similar processing is performed until the binarization processing reaches the last line of the combined pattern.

The areas 1 and 2 (FIG. 9) of the binary image formed in the foregoing manner are subjected to the above-described comparison processing. When values of the corresponding pixels in the two areas do not coincide, the correction taking the neighboring pixels into consideration is performed as has been described above.

Accordingly, it is possible to apply the cyclic error diffusion method to reduce boundary noise, thus minimizing deterioration in image quality, as similar to the case of repeatedly printing the basic pattern simply in the horizontal and vertical directions.

Each of the embodiments described above has exemplified a printer, which comprises means (e.g., an electrothermal transducer, laser beam generator, and the like) for generating heat energy as energy utilized upon execution of ink discharge, and causes a change in state of ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse-form driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In addition, not only an exchangeable chip type printhead, as described in the above embodiment, which can be electrically connected to the apparatus main unit and can receive ink from the apparatus main unit upon being mounted on the apparatus main unit but also a cartridge type printhead in which an ink tank is integrally arranged on the printhead itself can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printhead or by combining a plurality of printheads.

Moreover, in each of the above-mentioned embodiments of the present invention, it is assumed that the ink is a liquid. Alternatively, the present invention may employ ink which is solid at room temperature or less, or ink which softens or liquefies at room temperature, or ink which liquefies upon application of a printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, ink which is solid in a non-use state and liquefies upon heating may be used. In any case, ink which liquefies upon application of heat energy according to a printing signal and is discharged in a liquid state, ink which begins to solidify when it reaches a printing medium, or the like, is applicable to the present invention. In this case, ink may be situated opposite to electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned ink.

In addition, the ink-jet printer of the present invention may be used in the form of a copying machine combined with a reader, and the like, or a facsimile apparatus having a transmission/reception function in addition to an image output terminal of an information processing equipment such as a computer.

The present invention can be applied to a system constituted by a plurality of devices (e.g., host computer, interface, reader, printer) or to an apparatus comprising a single device (e.g., copy machine, facsimile). Further, it goes without saying that the invention is applicable also to a case where the object of the invention is attained by supplying a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the new functions according to the invention, and the storage medium storing the program codes constitutes the invention.

Further, the storage medium, such as a floppy disk, hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or entire process in accordance with designations of the program codes and realizes functions of the above embodiments.

The present invention is not limited to the above embodiments and various changes and modifications can be made within the spirit and scope of the present invention. Therefore, to appraise the public of the scope of the present invention, the following claims are made.

What is claimed is:

1. An image processing apparatus for converting a basic image represented by multivalued data into a binary image representing the basic image in pseudo tones, and repeatedly printing the binary image on a print medium, comprising:

binarizing means for sequentially comparing a value of each pixel representing the basic image with a predetermined threshold value, and performing binarization on the pixel in accordance with the comparison result;

diffusing means for diffusing errors, generated in the binarization, to neighboring pixels of a pixel of interest by employing an error diffusion matrix having a predetermined size;

incorporation means for incorporation, among the errors diffused by said diffusing means, an error which is outside the basic image into an area where said binarizing means has not performed the binarization, and combining means for forming a combined image by adjoining a supplemental image which is a part of the basic image to the basic image, wherein the combined image is subjected to the binarization performed by said binarizing means, error diffusion performed by said diffusing means and error incorporation performed by said incorporating means.

2. The apparatus according to claim 1, wherein said incorporating means incorporates the error outside an edge of the basic image into an edge opposite to said edge, where binarization has not been performed.

3. The apparatus according to claim 1, further comprising correcting means for, upon incorporating the error by said incorporating means, comparing an image data value in a first area of the supplemental image inclusive of a line adjacent to the basic image, with an image data value in a second area of the basic image corresponding to the first area, and correcting the image data values of the first and second areas in accordance with the comparison result.

4. The apparatus according to claim 3, wherein in a case where the image data value in the first area coincides with the image data value in the second area, said correcting means utilizes said image data value as a pseudo tone value without correction, and in a case where the image data value in the first area does not coincide with the image data value in the second area, said correcting means utilizes, as the pseudo tone value, a value corrected based on data values of neighboring pixels of the pixel of interest represented by said image data.

5. The apparatus according to claim 4, wherein said correcting means comprises:

weighted average means for calculating a weighted average of the neighboring pixels; and correction value generating means for comparing the multivalued data of the pixel of interest with the weighted average calculated by said weighted average means, and generating a correction value in accordance with the comparison result.

6. The apparatus according to claim 1, further comprising printing means for repeatedly printing the binary image on a print medium.

7. The apparatus according to claim 6, wherein said printing means includes an ink-jet printer having a printhead which prints an image by discharging ink on the print medium.

8. The apparatus according to claim 7, wherein said printhead is a printhead for discharging ink by utilizing heat energy, and includes heat energy transducers for generating heat energy to be applied to the ink.

9. The apparatus according to claim 7, wherein the printhead is a color printhead which performs printing in color by discharging cyan ink, magenta ink, yellow ink or black ink.

10. The apparatus according to claim 7, wherein the print medium, on which said ink-jet printer performs printing, includes fabric.

11. The apparatus according to claim 6, wherein said printing means prints the binary image on the print medium such that the binary image is repeatedly printed in horizontal and vertical directions, said combining means adjoins the supplemental image to one edge of the basic image situated in parallel to the horizontal direction, and said incorporating means incorporates the error in the horizontal direction.

12. The apparatus according to claim 6, wherein said printing means repeatedly prints the binary image on the print medium while shifting the binary image in a vertical direction by half the size of the binary image, said combining means adjoins the supplemental image to one edge of the basic image situated parallel to the vertical direction, and said incorporating means incorporates the error in the vertical direction.

13. The apparatus according to claim 1, further comprising:

inputting means for inputting the basic image; and generating means for generating a multivalued color image having R, G and B color components on the basis of the data inputted by said inputting means.

14. An image processing method for converting a basic image represented by multivalued data into a binary image representing the basic image in pseudo tones, and repeatedly printing the binary image on a print medium, comprising the steps of:

sequentially comparing a value of each pixel representing the basic image with a predetermined threshold value, and performing binarization on the pixel in accordance with the comparison result;

diffusing errors, generated in the binarization, to neighboring pixels of a pixel of interest by employing an error diffusion matrix having a predetermined size;

incorporating, among the errors diffused in said diffusing step, an error which is outside the basic image into an area where the binarization has not been performed in said binarizing step; and forming a combined image by adjoining a supplemental image which is a part, of the basic image to the basic image, wherein the combined image is subjected to the binarization in said binarizing step, error diffusion in said diffusing step and error incorporation in said incorporation step.

15. The method according to claim 14, wherein in said incorporating step, the error outside an edge of the basic image is incorporated into an edge opposite to said edge, where binarization has not been performed.

16. The method according to claim 14, further comprising the step of, upon incorporating the error in said incorporating step, comparing an image data value in a first area of the supplemental image inclusive of a line adjacent to the basic image, with an image data value in a second area of the basic image corresponding to the first area, and correcting the image data values of the first and second areas in accordance with the comparison result.

* * * * *